United States Patent [19]
Gardner

[11] Patent Number: 5,971,471
[45] Date of Patent: Oct. 26, 1999

[54] FOLD-OUT TENT CAMPER WITH SLIDE-OUT ROOM

[75] Inventor: Stewart E. Gardner, Bristol, Ind.

[73] Assignee: R-N-R International, Inc., Bristol, Ind.

[21] Appl. No.: 09/067,815

[22] Filed: Apr. 28, 1998

Related U.S. Application Data

[63] Continuation-in-part of application No. 08/929,495, Sep. 15, 1997.

[51] Int. Cl.⁶ .................................................. B60P 3/34
[52] U.S. Cl. .......................... 296/165; 296/171; 296/175; 296/26.13
[58] Field of Search .................................. 296/165, 170, 296/171, 175, 26.13, 26.14

[56] References Cited

U.S. PATENT DOCUMENTS

3,694,022  9/1972  Dontigny ................................. 296/170
5,567,003  10/1996  Gill ......................................... 296/171
5,570,924  11/1996  Few et al. ............................... 296/175
5,577,351  11/1996  Dewald, Jr. et al. ................... 296/171
5,860,686  1/1999  Tiedge ................................... 296/26.14

Primary Examiner—Gary C. Hoge
Attorney, Agent, or Firm—Baker & Daniels

[57] ABSTRACT

A fold-out tent camper is provided with a slide-out room providing increased living space. The slide-out room is supported through four-point linkages which extend between the opposite sides of the slide-out room and the corresponding edges of the aperture through which the slide-out room extends and retracts. The four-point linkages both guide the slide-out room as it extends and retracts, and also support the slide-out room when it is fully extended, thus eliminating the need for auxiliary supports.

18 Claims, 9 Drawing Sheets

FOLD-OUT TENT CAMPER WITH SLIDE-OUT ROOM

This is a Continuation-in-Part of U.S. patent application Ser. No. 08/929,495 filed Sep. 15, 1997.

This invention relates to a slide-out room that provides a larger living area for mobile living quarters, such as fold-out tent campers.

Fold-out tent campers provide a relatively low, fixed wall and a folding tent which expands from the fixed wall to provide the living area. Such folding tent campers have become popular because they are relatively compact and light, and thus are easy to tow and can be unfolded to provide living and sleeping areas. Some such tent campers are also provided with so-called "slide out rooms" in which a portion of one of the side walls "slides out" to provide an expandable auxiliary living space that expands from the main living area. The tent portion of the camper is designed to accommodate extension and retraction of the slide-out room. However, prior art fold-out tent campers having slide-out room require separate stabilizers that are installed to support the room when the room is extended from the main living area. Furthermore, prior art slide-out mechanisms for folding tent campers require a relatively large "step up" from the main living area to the auxiliary living area provided by the slide-out.

According to the present invention, a slide-out or retractable room for a folding tent camper is provided with a four-point linkage extending between the sides of the aperture provided in the sidewalls of the camper body and a frame supporting the floor of the slide-out room. The four-point linkages are pivotally and slidably connected to tracks extending along the side edges of the floor of the slide-out room to thereby permit the slide-out room to be extended an additional predetermined distance after the linkage is in its fully extended position. The linkage provides the necessary support for the slide-out room when moved into the extended position, thus limiting the need for separate stabilizers underneath the slide-out room floor for support. The linkages maintain the room square with the aperture, and the linkages are supplemented by a reinforcing rib that extends parallel to the side edges of the slide-out room floor. A guide mechanism mounted on the floor of the main living area engages the rib, thus restraining the slide-out room from tilting and cocking relative to the main living area. Since the linkages operate at the side of the slide-out room, and the reinforcing rib is relatively small, only a minimal difference in the height between the floor of the slide-out room and the floor of the main living area is required. Furthermore, the present invention is able to accommodate cut-outs around the wheel well of the tent camper.

These and other advantages of the present invention will become apparent from the following description, with reference to the accompanying drawings, in which.

Referring now to the drawings, a folding tent camper generally indicated by the numeral 10 includes side walls 12 and end walls 14 that cooperate to define the main living area. A top 16 closes against the walls 12 and 14 when the tent camper 10 is towed. The tent camper 10 is supported for towing on wheels 18, and is provided with a hitch 20 for connecting the tent camper 10 to a towing vehicle.

Figure 1:
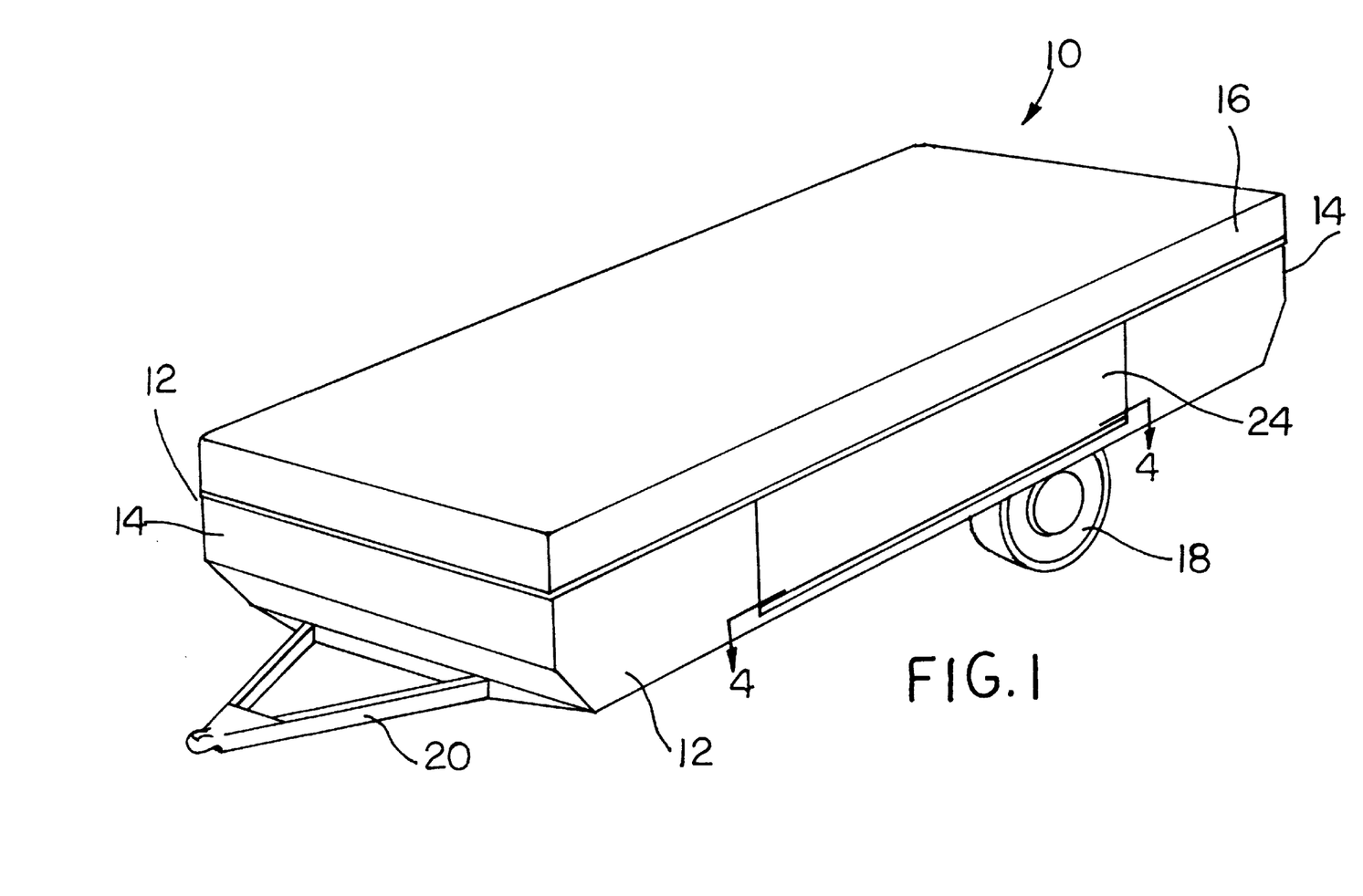
FIG. 1 is a view in perspective of a folding tent camper with a slide-out or extendable room made pursuant to the teachings of the present invention, the camper and slide-out room being illustrated in the closed position for transport.
Figure 2:
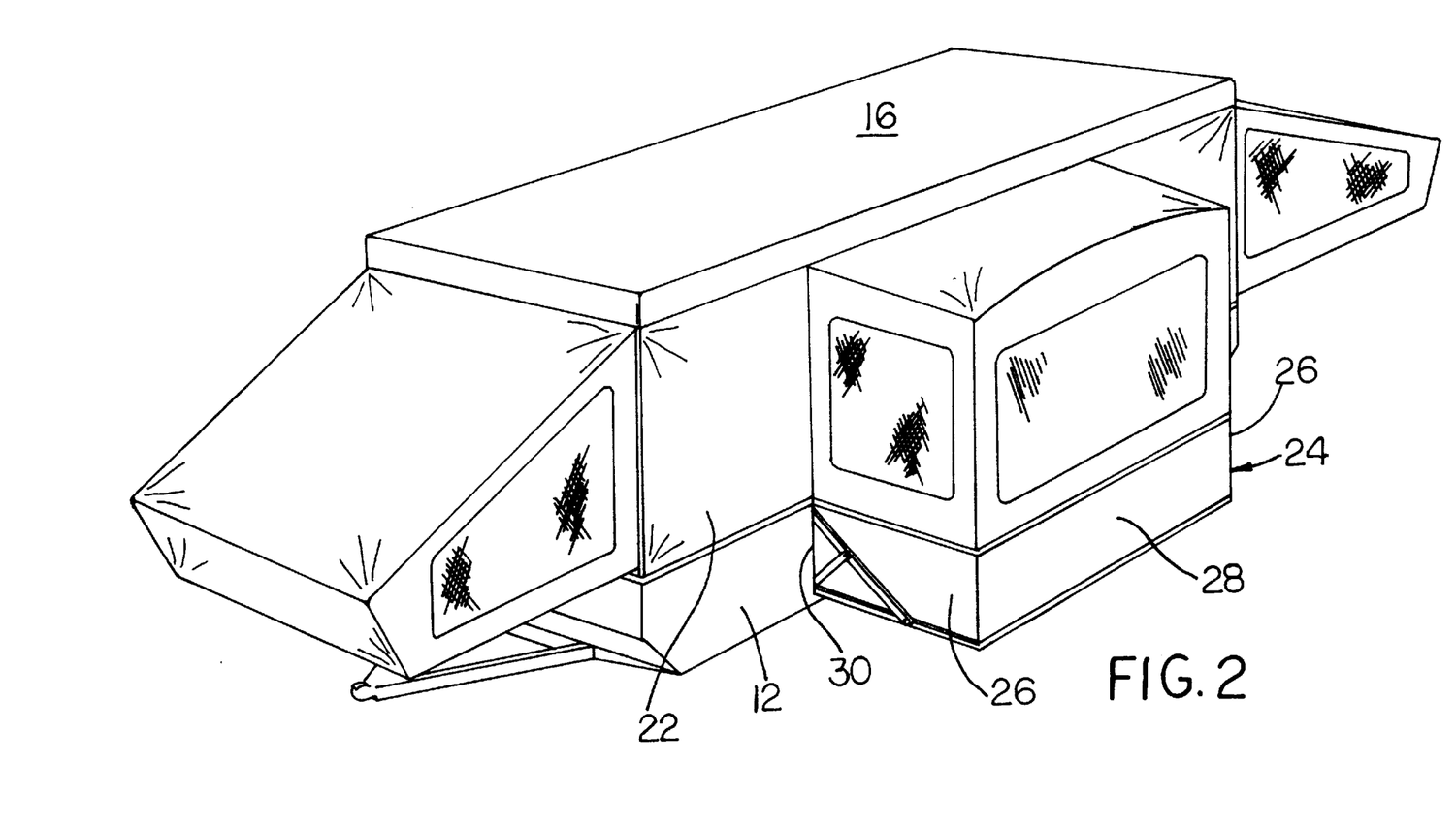
FIG. 2 is a view in perspective of the folding tent camper illustrated in FIG. 1, but with the folding tent camper and slide-out room expanded to provide living quarters.
Figure 3:
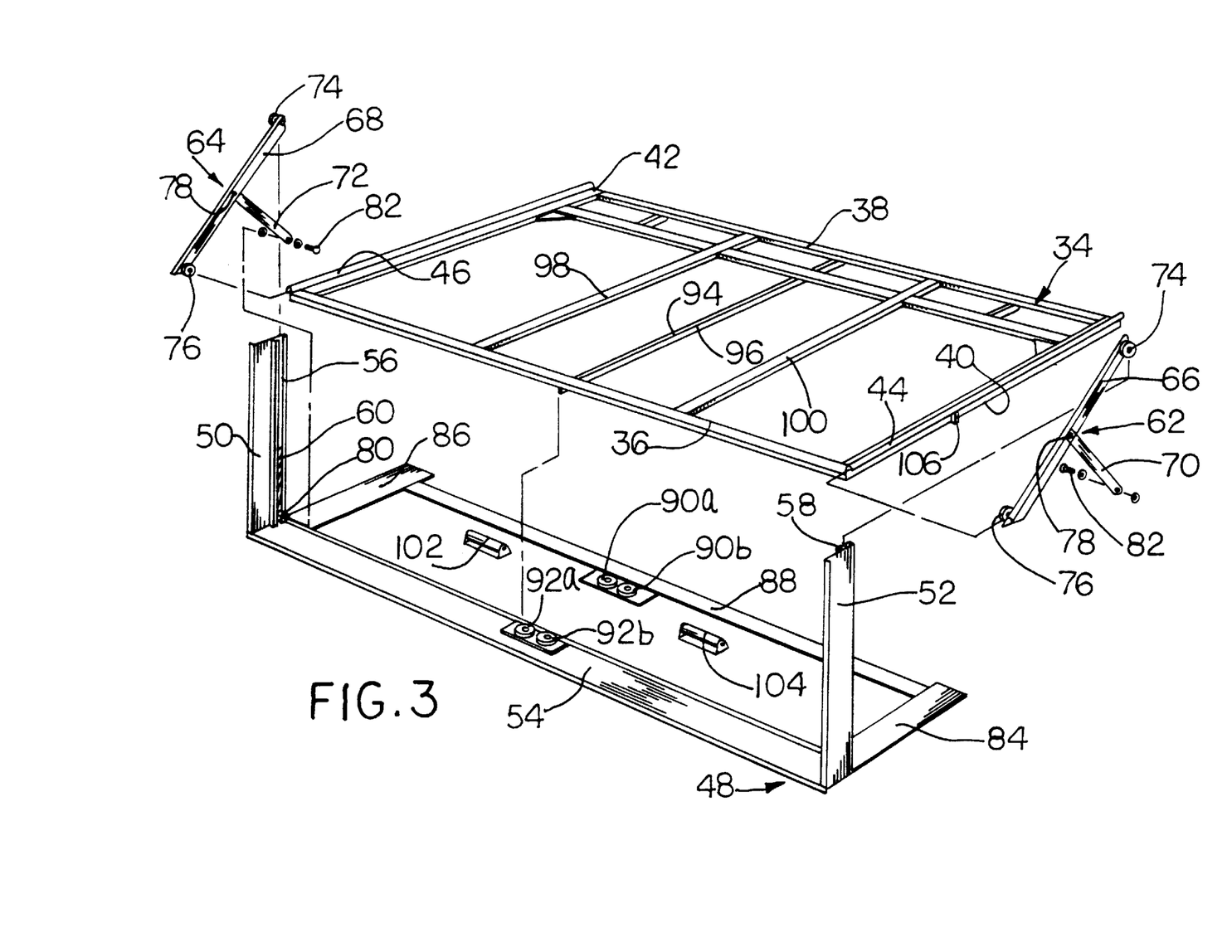
FIG. 3 is a view in perspective of the frame supporting the floor of the slide-out room used in the tent camper of FIGS. 1 and 2 and a portion of the structure defining the aperture in the side walls of the folding tent camper through which the slide-out room extends and retracts.

As is well known to those skilled in the art, the tent camper 10 is provided with an internal mechanism (not shown) which raises the top 16 and which allows canvas side walls generally indicated by the numeral 22 in FIG. 2 to deploy, thus defining a living area. Tent camper 10 is further equipped with a slide-out room generally indicated by the numeral 24, which is illustrated in its retracted position for transport in FIG. 1, and in its extended position to define an auxiliary living quarters in FIG. 2. The slide-out room 24 includes side edges 26 and an outer edge 28. The canvas walls 22 are designed to accommodate outward movement of the slide-out room 24. The slide-out room 24 extends and retracts through an aperture 30 in one of the side walls 12. The slide-out room 24 further includes a floor 32 (FIGS. 4–6), which is supported on a floor frame generally indicated by the numeral 34 (FIGS. 3–6). The floor 32 and floor frame 34 are adapted to slide along main floor 35 which extends between the side walls 12 and 14 to define the main living area, as the slide-out room 24 is extended and retracted.

The floor frame 34, which supports the floor 32, includes a front frame member 36 and rear frame member 38, both of which extend parallel to the aperture 30. The front and rear frame members 36, 38 are connected by side frame members 40, 42 which include portions defining a track 44, 46 thereon. A sub frame 48 is installed in the aperture 30 and includes vertical members 50, 52 which are installed on the edges of the wall 12 defining the aperture 30, and a transverse member 54, which is installed on the floor 35 of the main living area. Each of the side members 50, 52 are provided with tracks 56, 58 which extend vertically from the top of the corresponding member 50 or 52 to a fixed stop 60.

The floor frame 34 is mounted and guided for movement through the aperture 30 by four-point linkages generally indicated by the numerals 62, 64 which extend between the tracks 44, 46 on the floor frame member and the sub frame 48. Each of the linkages 62, 64 include a primary support arm 66, 68 and a secondary support arm 70, 72. Each of the primary support arms 66, 68 includes a bearing 74 which is adapted to slidably engage a corresponding track 56 or 58 in the side members 50 and 52. The bearings 74 are pivotally mounted to their corresponding primary support arm 66 and 68 such that the bearings 74 both slide along the tracks 56, 58 and allow their primary support arm 66 and 68 to pivot with respect thereto. A second bearing 76 is pivotally mounted to the ends of the primary support arms 66, 68 and is adapted to slidably engage the tracks 44, 46 on the end frame members 40, 42. The bearings 76 are substantially identical to the bearings 74, and permit the corresponding primary support arm 66 and 68 to both slide along their corresponding tracks 44 and 46 and pivot with respect thereto. The secondary support arms 70, 72 of the four-point linkages 62, 64 are pivotally connected to their corresponding primary support arms through a pivot connection 78. The end of the secondary support arms opposite the ends connected to the primary support arms 66, 68 are connected to members 50 and 52, respectively, by pivots 82. The pivots 82 are pivotally connected to sockets 80 extending from the side members 50 adjacent the lower ends of the tracks 56, 58.

The sub frame 48 further includes floor mounted members 84, 86 which are mounted on the floor 35 of the main living quarters and which project inwardly from the aperture 30 from the transverse member 54 adjacent the side members 50, 52. The floor members 84, 86 are connected by an inner transverse member 88 which extends substantially parallel to the transverse member 54. A pair of circular, rotatable guides 90a, 90b are mounted on the member 88 at substantially the midpoint thereof and cooperate with each other, defining a gap therebetween. Another set of rotatable guides 92a, 92b define a similar gap therebetween and are mounted on the transverse member 94. The frame 34 is provided with a cross member 94 which extends substantially parallel to the side frame members 40 and 42 between the front and rear frame members 36 and 38 at approximately the midpoint thereof. Cross member 34 is provided with a downwardly projecting rib 96 that is received in the gap between the guides 90a, 90b and 92a, 92b when the floor frame 34 is installed on the floor 35. Floor frame 34 further includes cross frame members 98, 100 which extend substantially parallel to the cross frame member 94. Cross frame members 98, 100 are adapted to engage transversely extending rollers 102, 104 that are mounted on the floor 35 and assist in supporting the frame 34 by their engagement with the cross frame members 98, 100 as the floor frame 34 is extended and retracted. Rollers 105 are optionally provided on member 86 to further support the floor frame 34. The tracks 44, 46 of the floor frame member 34 are provided with stops 106, 104 which limit the range of sliding movement of the bearings 76 and their corresponding tracks 44, 46.

Figure 4:
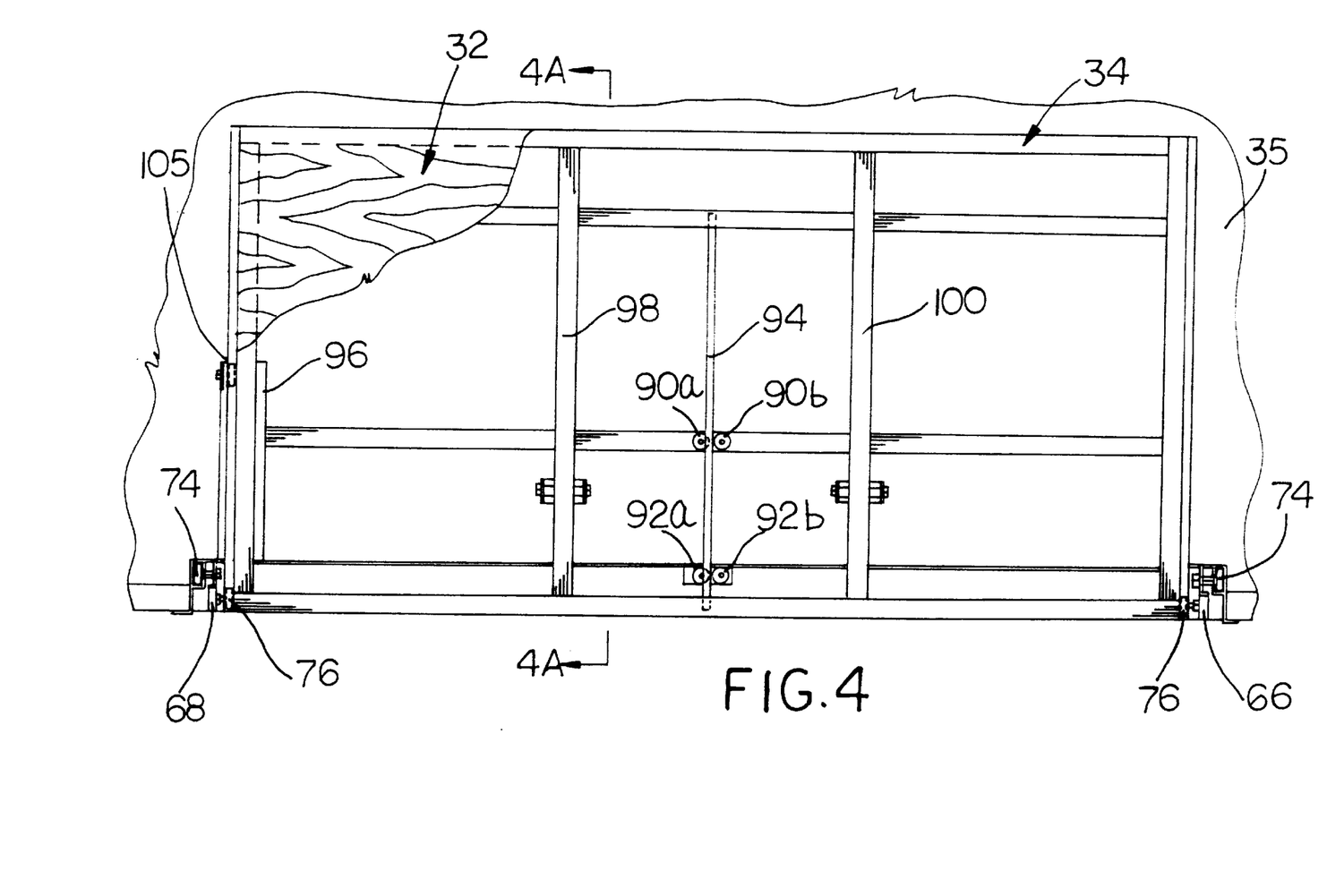
FIG. 4 is a cross-sectional view taken substantially along lines 4—4 of FIG. 1 illustrating the floor of the slide-out room of the folding tent camper, a portion of the floor being cut away to reveal the frame supporting the floor.
Figure 4A:
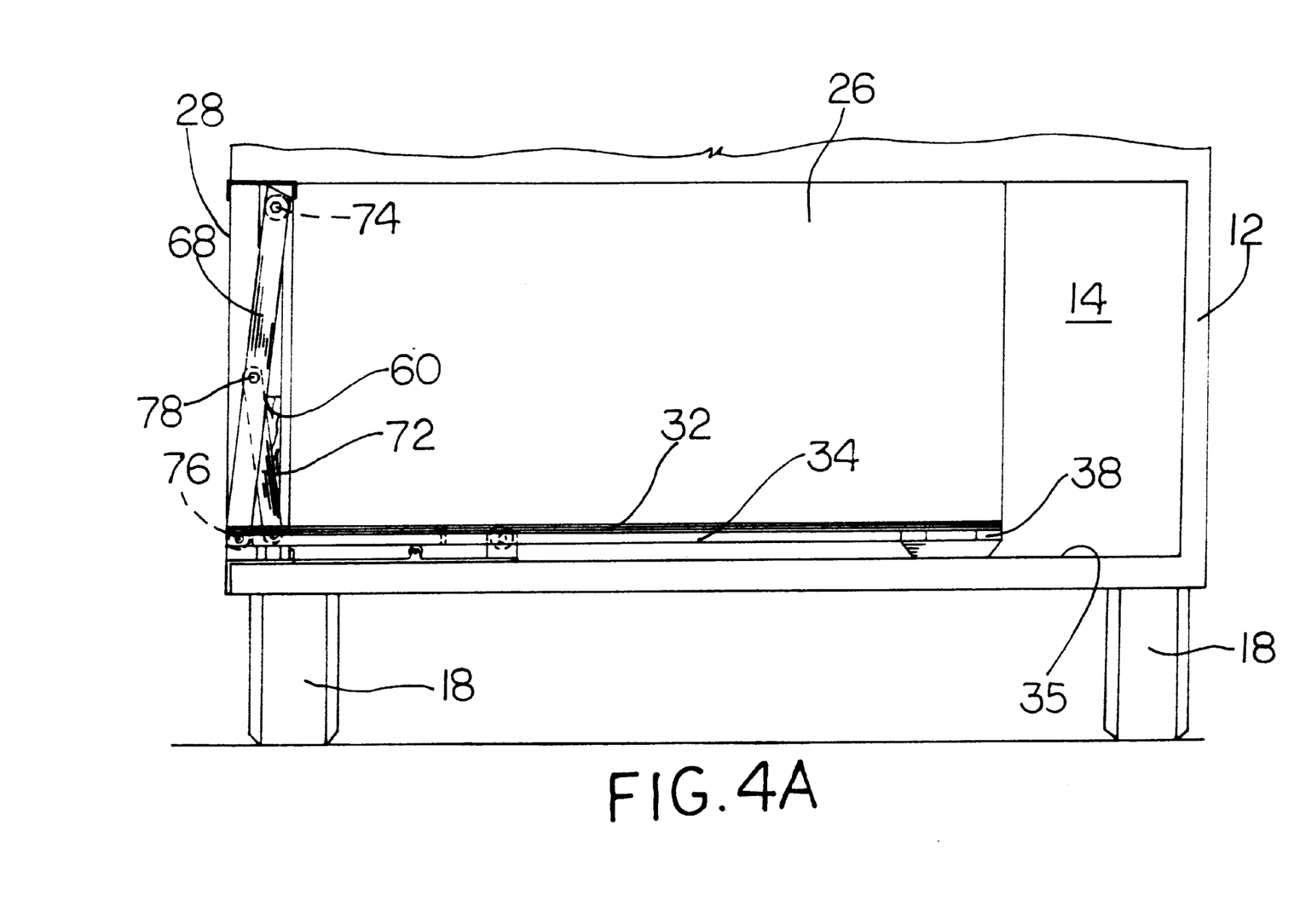
FIG. 4A is a fragmentary, cross-sectional view taken substantially along lines 4a—4a of FIG. 4, and illustrating the slide-out or retractable room in the fully retracted position.
Figure 5:
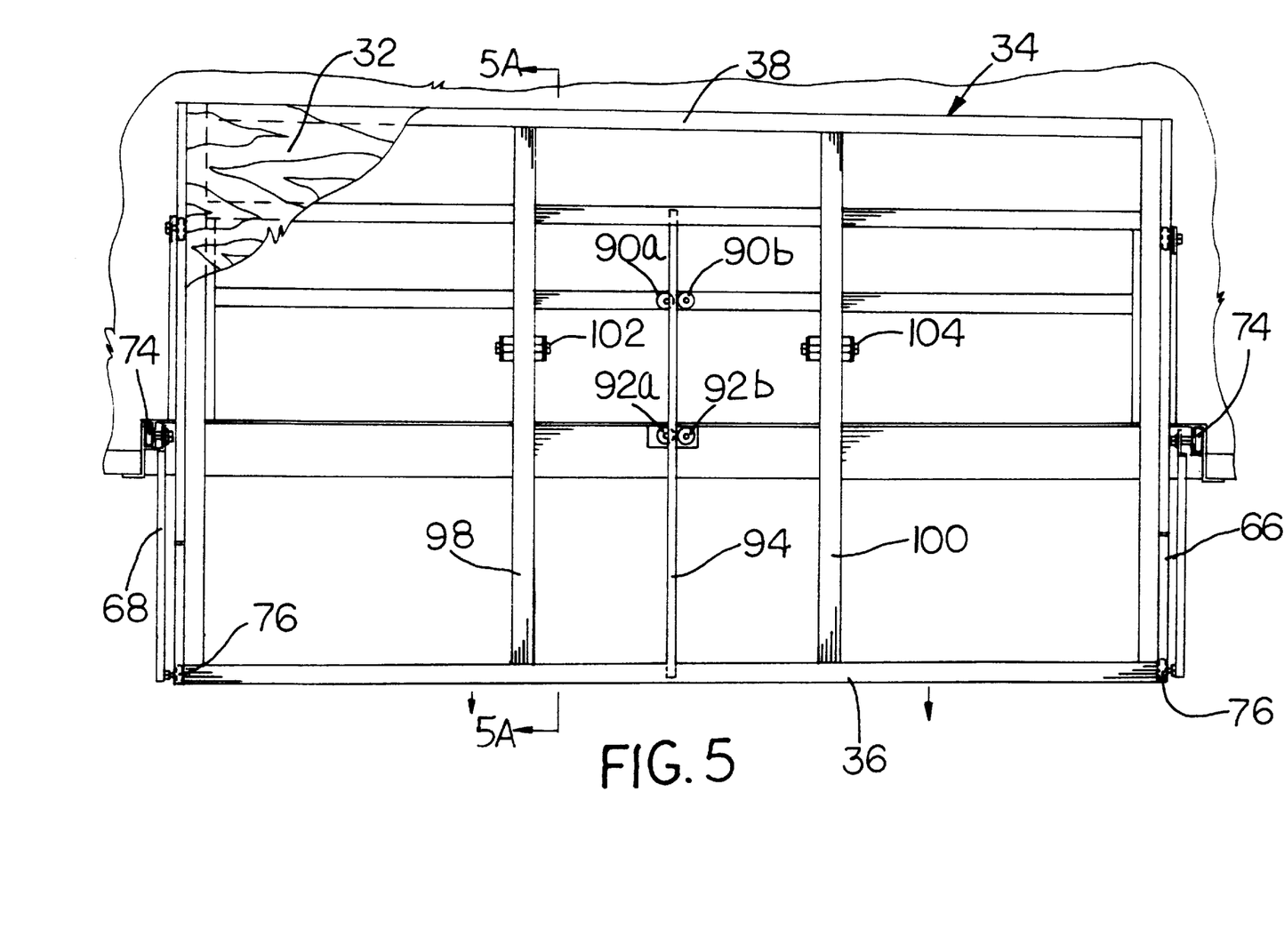
FIG. 5 is a view similar to FIG. 4, but illustrating the slide-out room in an intermediate position between the fully retracted and fully extended positions.
Figure 5A:
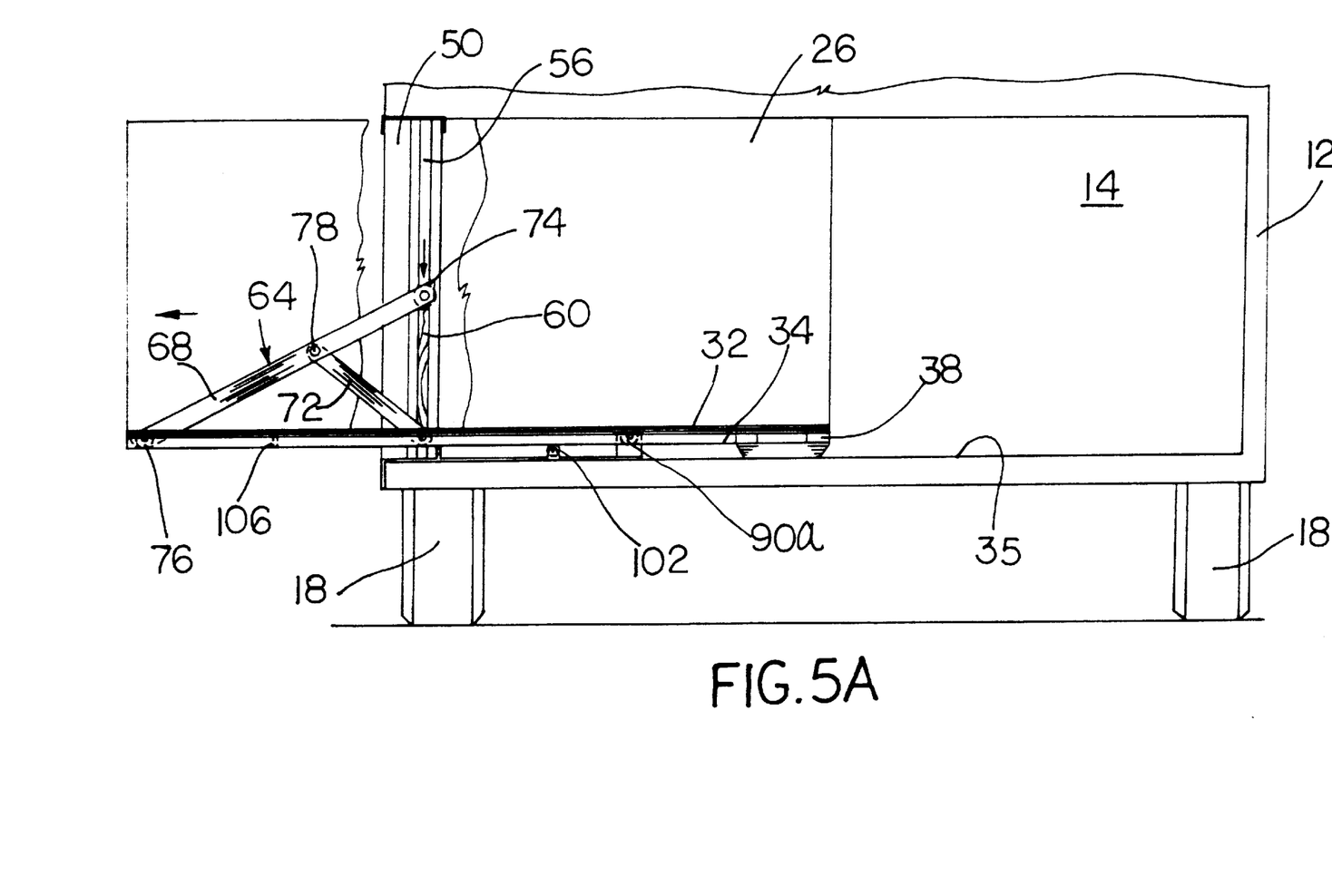
FIG. 5A is a view taken substantially along line 5a—5a of FIG. 5.
Figure 6:
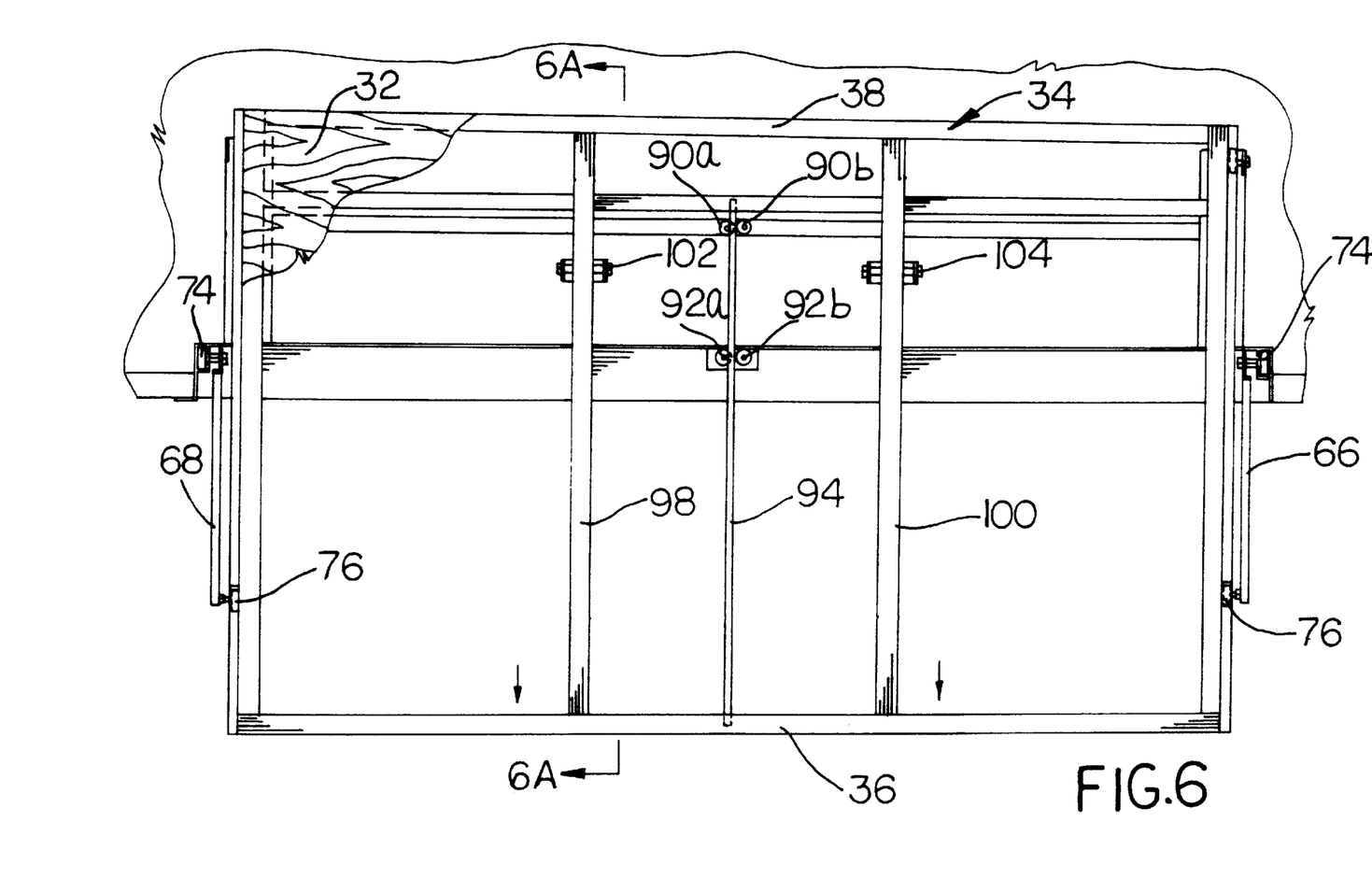
FIG. 6 is a view similar to FIGS. 4 and 5, but illustrating the slide-out room in the fully extended position.
Figure 6A:
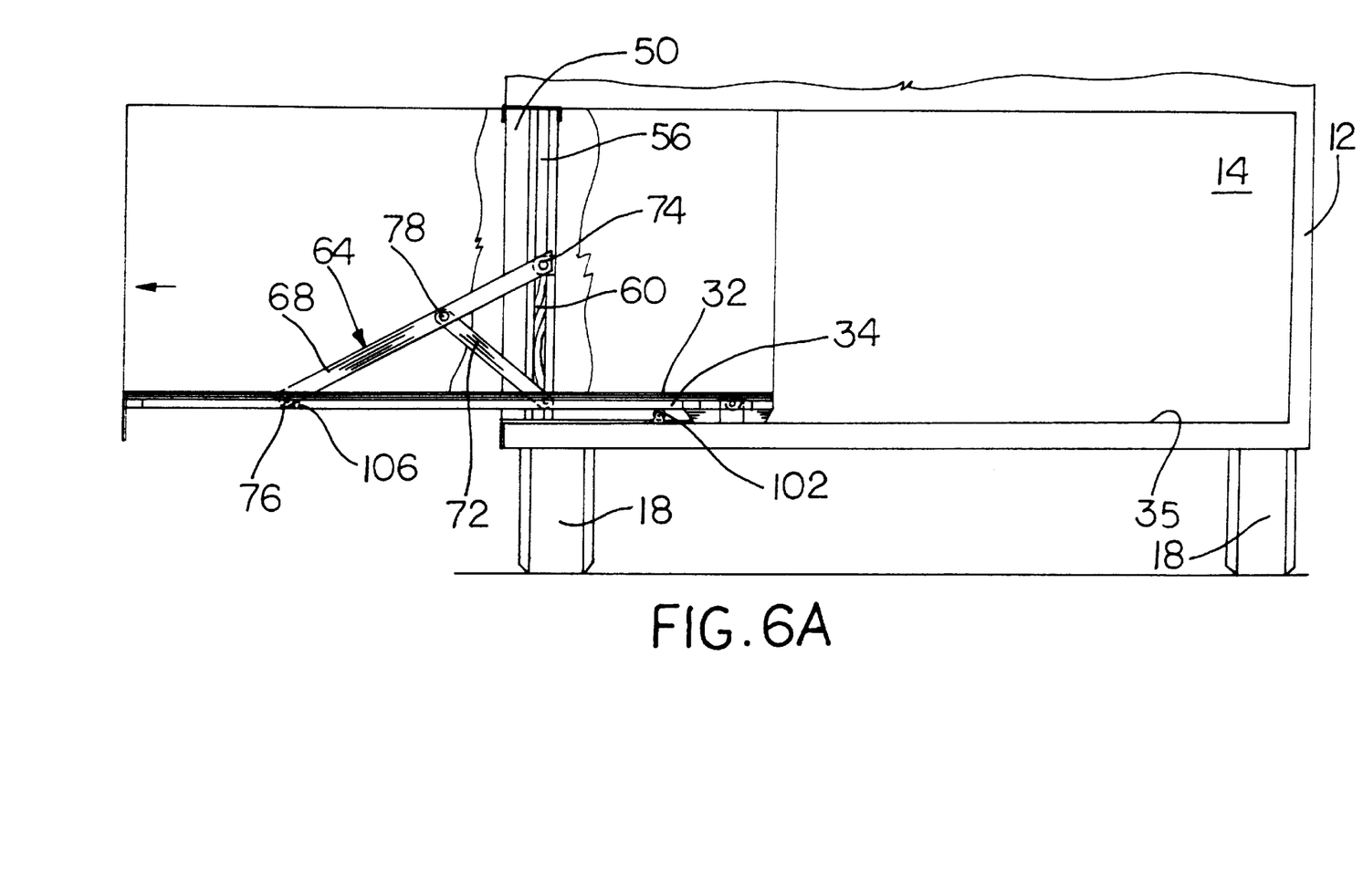
FIG. 6A is a view taken substantially along line 6a—6a of FIG. 6.

In operation, the slide-out room 24 is illustrated in FIGS. 4 and 4A in its fully retracted position, in which the primary support arms 66, 68 are just a few degrees off vertical, the bearings 74 are at the top end of their corresponding tracks 56, 58, and the bearings 76 are at the ends of the corresponding tracks 44, 46 adjacent the front frame member 36. The slide-out room 24 may be extended or retracted manually by pulling or pushing on the walls of the slide-out room. The friction between the bearing 76 and the corresponding tracks 44, 46 may cause the bearing to move with the tracks during initial movement of the slide-out room through the aperture 30, which continues until the slide-out room is in the position illustrated in FIGS. 5 and 5A, in which the bearing 74 is engaged with the corresponding stop 60, thus limiting further outward movement of the bearings 76. Additional outward movement of the slide-out room causes the tracks 44, 46 to move relative to the bearings 76 until the stops 106 engage the bearings 76, as illustrated in FIGS. 6 and 6A. The slide-out room is now in the fully extended position. After the bearings 76 are worn somewhat and their friction with their corresponding tracks is no longer sufficient to cause the bearings to move with the tracks during the initial outward movement of the slide-out room, the slide-out room moves relative to the support arms 66, 68 until the stops 106 engage the bearings 76, wherein additional outward movement of the slide-out room causes the support arms 66, 68 to pivot about their bearings 76 to bring the upper bearings 74 to slide vertically along their tracks 56, 58 until they engage the stop 60. In either event, the room is extended into the fully extended position illustrated in FIGS. 6 and 6A.

When the room is to be retracted, the room is merely pushed inwardly through the aperture 24, until the fully retracted position illustrated in FIGS. 4 and 4A is attained. It will be noted that the four-point linkages 62, 64 maintain the slide-out room horizontal, and also cooperate with the guides 90a,b and 92a,b to maintain the slide-out room plumb with the aperture 24. Accordingly, the force required to operate the slide-out room is minimized. The support provided by the four-point linkages 62, 64 not only maintains the slide-out room horizontal during its extension and retraction to minimize the force required, the four-point linkages 62, 64 also act as supports for the slide-out room in the fully extended position. Accordingly, no jacks or other auxiliary supports need be placed under the floor of the slide-out room when it is in the fully extended position. It will also be noted that the height of the floor of the slide-out room above the floor 35 of the main living quarters is limited to the thickness of the frame 34, the floor 32, and the distance that the rollers 102, 104 support the floor above the room. This distance is much less than the several inches required by prior art actuating mechanisms.

What is claimed is:

1. Mobile living quarters comprising a main living area having a main living area floor and main living area walls cooperating with said main living area floor to define said main living area, a retractable room mounted for movement from a retracted position retracted into the main living area to an extended position extended from the main living area, said retractable room being retractable through an aperture in one of the walls defining the main living area, and support structure pivotally mounted on said retractable room by a first pivot connection and pivotally mounted on said main living area by a second pivot connection, said first pivot connection being slidably connected to said retractable room to permit the retractable room to slide relative to said support structure and said main living area.

2. Mobile living quarters as claimed in claim 1, wherein said second pivot connection is slidably mounted on said main living quarters.

3. Mobile living quarters as claimed in claim 2, wherein said support structure is a four point linkage connected to said retractable room by said first pivot connection and to said main living quarters by said second pivot connection and by a third pivot connection.

4. Mobile living quarters as claimed in claim 3, wherein said retractable room includes a stop engaging said first pivot connection after the retractable room slides relative to the first pivot connection for a predetermined distance.

5. Mobile living quarters as claimed in claim 4, wherein said four point linkage includes a first support arm extending between said first and second pivot connections and a second support arm extending between said first support arm and said third pivot connection.

6. Mobile living quarters as claimed in claim 4, wherein said retractable room includes a floor, said floor defining a track along a side thereof, said first pivot connection sliding in said track.

7. Mobile living quarters as claimed in claim 6, wherein said stop projects into said track to engage said first pivot connection.

8. Mobile living quarters as claimed in claim 1, wherein said retractable room includes a stop engaging said first pivot connection after the retractable room slides relative to the first pivot connection for a predetermined distance.

9. Mobile living quarters as claimed in claim 8, wherein said retractable room includes a floor, said floor defining a track along a side edge thereof, said first pivot connection sliding in said track.

10. Mobile living quarters as claimed in claim 9, wherein said stop projects into said track to engage said first pivot connection.

11. Mobile living quarters as claimed in claim 10, wherein said floor includes a floor frame supporting a floor member, said floor frame extending across said aperture for supporting said floor member for sliding movement through the aperture, said track being defined on an edge of the floor frame extending through the aperture.

12. Mobile living quarters as claimed in claim 1, wherein said retractable room includes a floor, said floor defining tracks along opposite side edges thereof, said support structure including members extending on opposite side edges of said floor, each member including a said first pivot connection sliding in a corresponding track, a reinforcing member extending parallel to and between said tracks, and guide members mounted on said main living quarters and engaging said reinforcing member to guide the retractable room for movement through the aperture.

13. Mobile living quarters as claimed in claim 12, wherein said retractable room includes a pair of stops engaging said first pivot connections after the retractable room slides relative to the first pivot connections for a predetermined distance.

14. Mobile living quarters as claimed in claim 1, wherein said retractable room includes a floor, said floor having opposite side edges, said support structure including members extending on opposite side edges of said floor, each member including a said first pivot connection engaging a corresponding one of the side edges, a reinforcing member extending parallel to and between said side edges, and guide members mounted on said main living quarters and engaging said reinforcing member to guide the retractable room for movement through the aperture.

15. Mobile living quarters as claimed in claim 14, wherein said first pivot connections are slidably engaged with their corresponding side edges to permit said floor to slide relative to the first pivot connections.

16. Mobile living quarters comprising a main living area having a main living area floor and main living area walls cooperating with said main living area floor to define said main living area, a retractable room mounted for movement from a retracted position retracted into the main living area to an extended position extended from the main living area, said retractable room being retractable through an aperture in one of the walls defining the main living area, and support structure pivotally mounted on said retractable room by a first pivot connection and pivotally mounted on said main living area by a second pivot connection, said retractable room includes a floor, said floor having opposite side edges, said support structure including members extending on opposite side edges of said floor, each member including a said first pivot connection engaging a corresponding one of the side edges, a reinforcing member extending parallel to and between said side edges, and guide members mounted on said main living quarters and engaging said reinforcing member to guide the retractable room for movement through the aperture.

17. Mobile living quarters as claimed in claim 16, wherein said second pivot connections slidably engage said side edges.

18. Mobile living quarters as claimed in claim 17, wherein said retractable room includes a pair of stops engaging said pivot connections after the retractable room slides relative to the first pivot connections for a predetermined distance.

* * * * *